United States Patent [19]

Brooks

[11] 4,333,715
[45] Jun. 8, 1982

[54] MOVING PICTURE APPARATUS

[76] Inventor: Philip A. Brooks, 436 NW. 46th Ter., Oklahoma City, Okla. 73118

[21] Appl. No.: 34,293

[22] Filed: Apr. 30, 1979

Related U.S. Application Data

[63] Continuation-in-part of Ser. No. 941,146, Sep. 11, 1978, Pat. No. 4,294,516.

[51] Int. Cl.³ .................. G03B 25/00; G09F 13/00; G02F 1/133
[52] U.S. Cl. .................................. 352/98; 40/443; 350/335; 352/87
[58] Field of Search ............... 352/98, 99, 100, 87; 40/442, 443, 448, 543; 350/347 E, 352, 335

[56] References Cited

U.S. PATENT DOCUMENTS

| | | | |
|---|---|---|---|
| 2,213,868 | 9/1940 | Lucian | 40/543 |
| 2,570,652 | 10/1951 | Dilks | 352/102 |
| 2,689,917 | 9/1954 | Switzer | 40/543 |
| 2,727,429 | 12/1955 | Jenkins | 352/89 |
| 2,878,606 | 3/1959 | Meijer | 40/543 |
| 2,879,614 | 3/1959 | Baldanza | 40/543 |
| 2,888,857 | 6/1959 | Stevenson et al. | 40/442 |
| 2,977,845 | 4/1961 | Boone | 352/87 |
| 3,068,010 | 12/1962 | Hagopian | 40/543 |
| 3,576,364 | 4/1971 | Zanoni | 352/87 |
| 3,582,197 | 6/1971 | Eaves | 352/87 |
| 3,594,060 | 7/1971 | Lowe | 350/3.5 |
| 3,606,517 | 9/1971 | Jacobson et al. | |
| 3,622,224 | 11/1971 | Wysocki | 350/335 |
| 3,625,584 | 12/1971 | St. John | 350/3.5 |
| 3,756,694 | 9/1973 | Soref | 350/347 E |
| 3,807,828 | 4/1974 | Johnson et al. | 350/3.5 |
| 3,807,831 | 4/1974 | Soref | 350/347 E |
| 3,836,230 | 9/1974 | Adams et al. | 350/352 |
| 3,876,287 | 4/1975 | Sprokel | 350/347 E |
| 3,878,537 | 4/1975 | Roncillat et al. | 350/347 E |
| 3,915,551 | 10/1975 | Silverman et al. | 350/3.5 |
| 3,944,331 | 3/1976 | Janning | 350/335 |
| 3,985,419 | 10/1976 | Matsumoto et al. | 350/3.5 |
| 3,989,355 | 11/1976 | Wilmer | 350/335 |
| 4,021,945 | 5/1977 | Sussman | 40/448 |
| 4,039,245 | 8/1977 | Yano | 350/3.5 |
| 4,111,534 | 9/1978 | Cirkler et al. | 350/347 E |
| 4,137,524 | 1/1979 | Chen et al. | 350/335 |
| 4,156,555 | 5/1979 | McMahon . | |

OTHER PUBLICATIONS

IBM Technical Disclosure Bulletin, vol. 15, No. 2, Jul. 1972, pp. 700, 701.

*Primary Examiner*—Monroe H. Hayes
*Attorney, Agent, or Firm*—Head & Johnson

[57] ABSTRACT

Apparatus for creating the effect of pictures moving in two and three dimensions including a display structure, a number of image producers, and a scanning controller. The display structure contains elements upon which to place the image producers, which elements are arranged in either depth for creating a three-dimensional effect or in width for providing a two-dimensional effect. The image producers can be configured electrodes or surface-covering electrodes used to affect liquid crystal elements of the display structure. Also, the image producers can be radiation sources which cause the images which are to be displayed to become visible to a viewer. The scanning controller is an electronic device which sequentially activates individual members of the image producers to thereby impart the effect of two- or three-dimensional motion depending on the type of display structure utilized.

2 Claims, 20 Drawing Figures

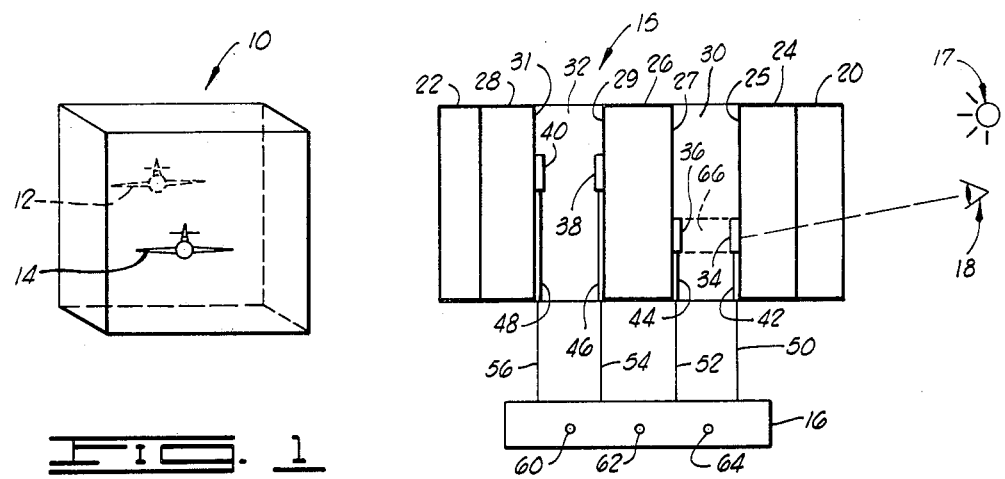
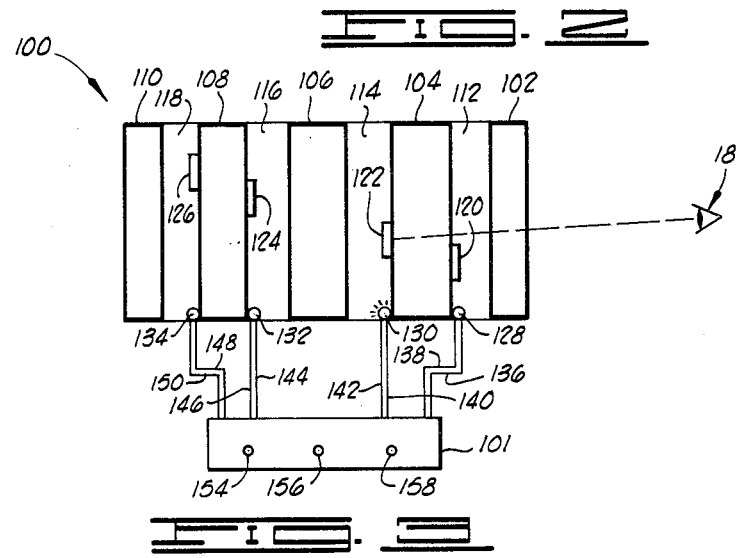
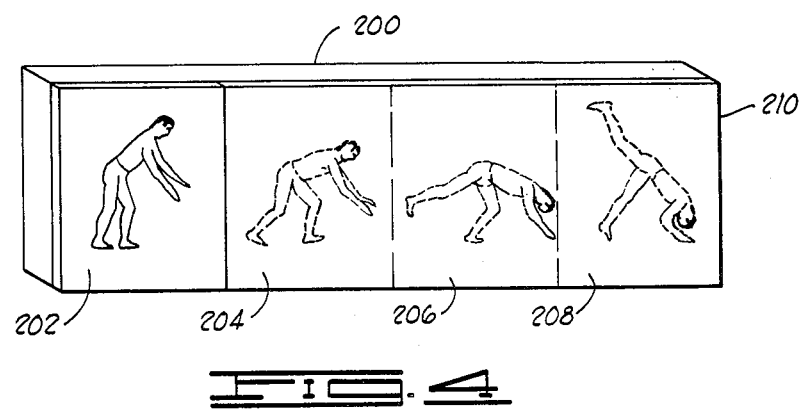

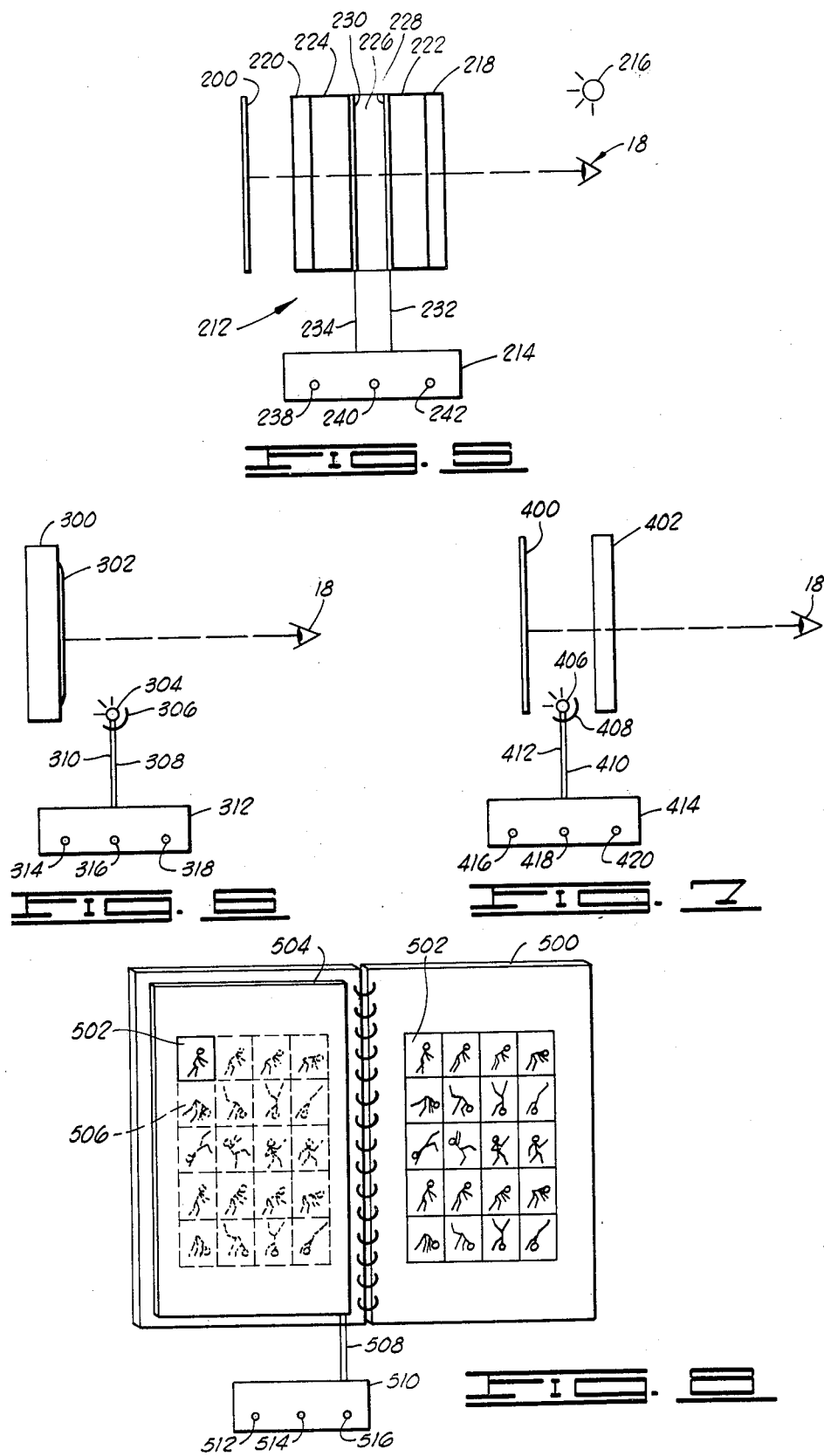

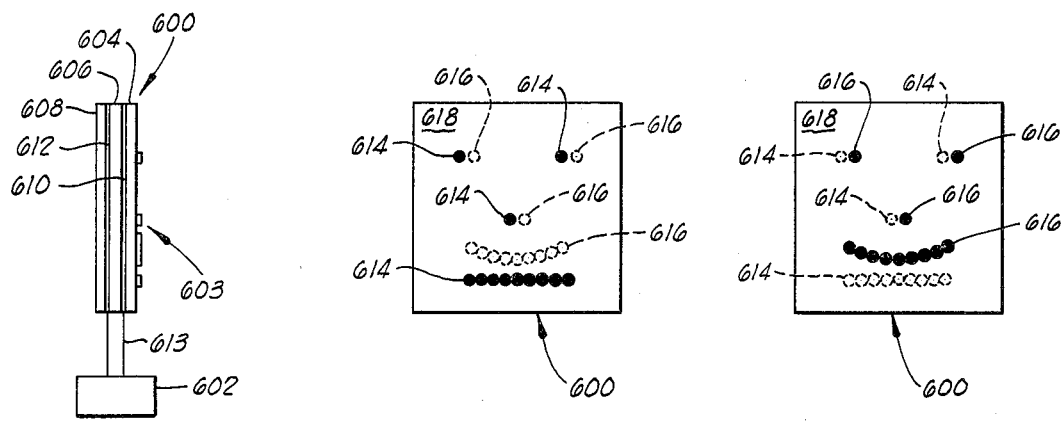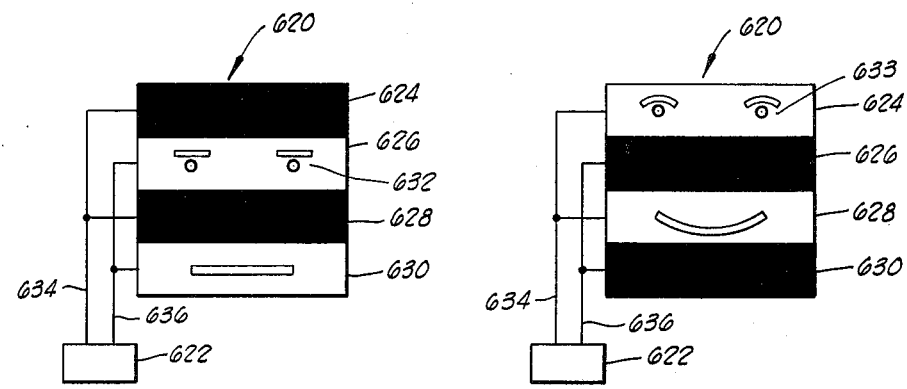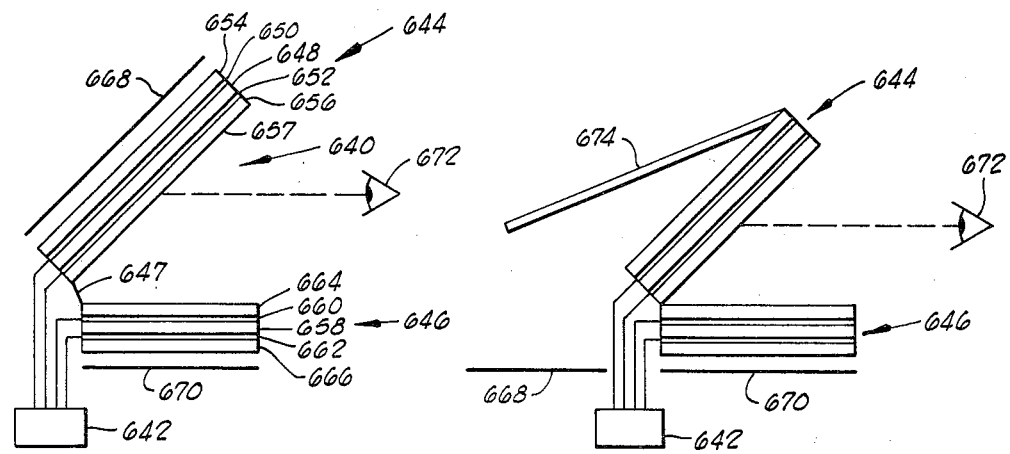

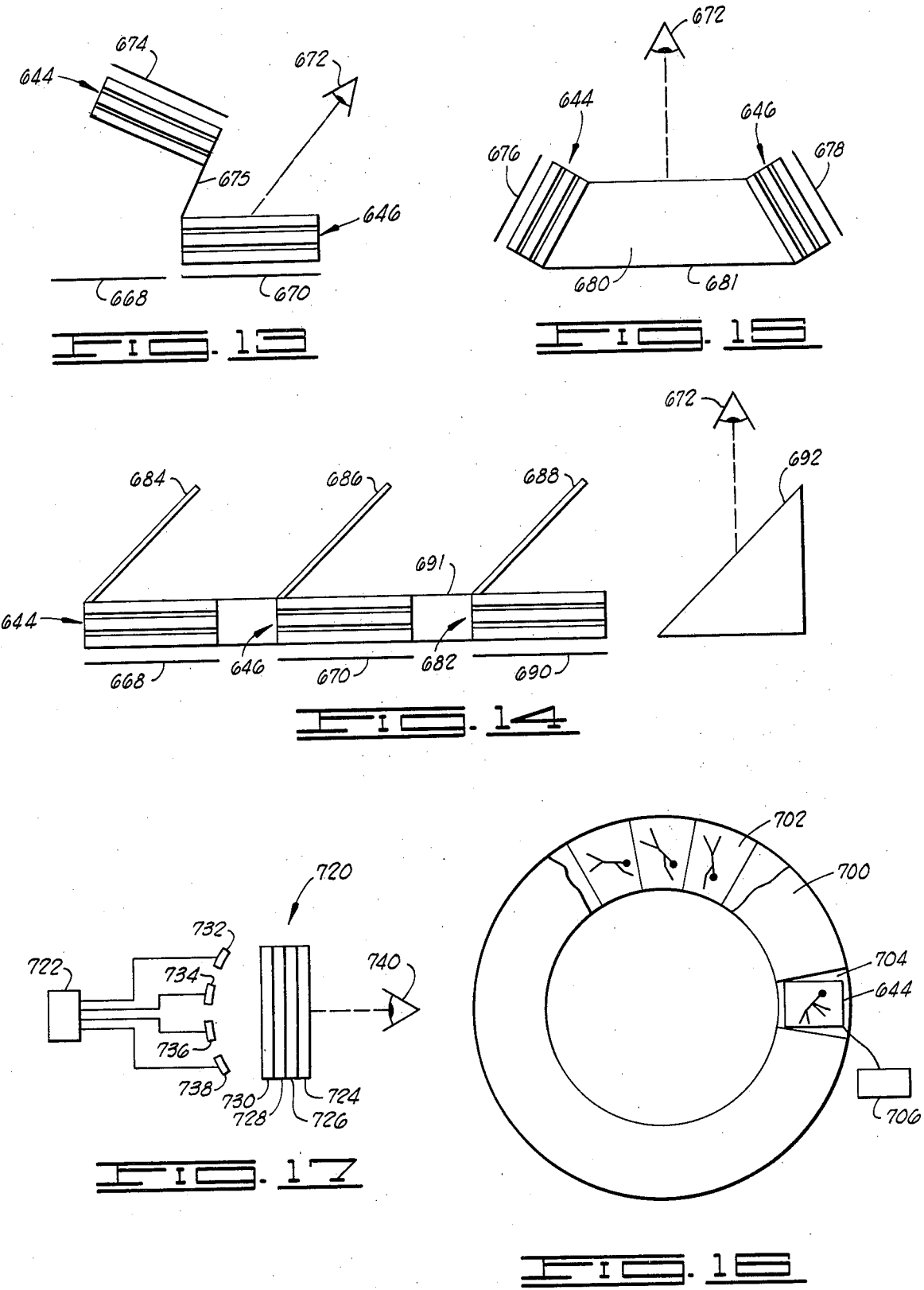

MOVING PICTURE APPARATUS

REFERENCE TO RELATED APPLICATION

This application is a continuation-in-part of my U.S. patent application Ser. No. 941,146 filed Sept. 11, 1978 and entitled "Moving Picture Apparatus" now U.S. Pat. No. 4,294,516.

BACKGROUND OF THE INVENTION

1. Field of the Invention

This invention relates generally to apparatus for creating the effect of moving pictures from a series of stationary images and more particularly, but not by way of limitation, to apparatus for creating moving pictures in two and three dimensions by scanning a series of stationary images.

2. Description of the Prior Art (Prior Art Statement)

The following statement is intended to be a Prior Art Statement in compliance with the guidance and requirements of 37 C.F.R. §§1.56, 1.97 and 1.98.

Apparatus for creating the effect of moving pictures have been disclosed in a number of previously issued patents which are believed pertinent to the present application. U.S. Pat. No. 2,543,793 issued to Marks discloses a three-dimensional intercommunicating system. This suggested system includes layers of liquid crystal blocks each containing arrays of wires which can be scanned and activated to create various images on each liquid crystal layer. The patent further indicates that the effect of motion is imparted to the images by sequentially activating each liquid crystal layer. Also disclosed is the use of layers of polarizing substances in association with the liquid crystal blocks.

In addition to the Marks apparatus, other devices which have been proposed to include stacked layers of liquid crystal members are disclosed in U.S. Pat. No. 3,992,082 issued to Katz and U.S. Pat. No. 3,955,208 issued to Wick et al. Furthermore, U.S. Pat. No. 3,918,796 issued to Fergason discloses a block of layered liquid crystals in combination with two polarizers.

The effect of motion has also been disclosed in U.S. Pat. No. 3,951,529 issued to Gandia which discloses a stroboscopic means of illuminating signs for use along a vehicle pathway. The stroboscopic means creates the effect of moving pictures by sequentially illuminating a series of individual scenes arranged in horizontally spaced relation to each other at a particular rate according to the setting on a control box. Another system for displaying pictures in conjunction with a moving vehicle is indicated in U.S. Pat. No. 3,704,064 issued to Sollogoub et al. in which each horizontally arranged picture adjoins each bordering picture.

Additional patents which disclose apparatus involving two- and three-dimensional pictures and which are known to Applicant and believed to be of interest include:

| Inventor | Patent No. |
| --- | --- |
| Miyazaki | 3,961,348 |
| Meszlenyi | 3,743,394 |
| Koenig | 3,694,062 |
| Shindo | 3,582,961 |
| Bonnet | 2,434,385 |
| Arendt | 2,319,287 |
| Arendt | 2,299,731 |

-continued

| Inventor | Patent No. |
| --- | --- |
| Rosenthal et al. | 2,026,753 |

As shown by the above-mentioned disclosures, there is a need for an apparatus which creates the effect of moving pictures in both two and three dimensions. There is, also, the need for such a device to be compact and in a self-contained unit. Furthermore, there is the need for such an apparatus to be simple to control so that anyone can utilize it. Additionally, there is the need to impart the effect of moving pictures to a stationary viewer. Still another need is to impart such effect by displaying a single image at a particular point in time while maintaining all other images or scenes unobservable to the viewer at that time.

The previous disclosures, however, do not describe an apparatus which fully meets these needs. Additionally, the devices of the prior disclosures have disadvantages or shortcomings which the present invention does not have.

One disadvantage of the Marks apparatus is that it is highly complex. Furthermore, it does not appear that the Marks apparatus could be reduced to the compact size attainable with the present invention.

Although the Katz, the Wick et al. and the Fergason patents disclose multi-layered crystal blocks, they do not disclose means for creating the effect of moving pictures therein.

The patents which disclose apparatus which effect two-dimensional motion likewise fail to indicate the present invention. The device of the Gandia patent fails to disclose liquid crystal frames disposed adjacent each other which are activated sequentially to reveal the desired scene. Also, the Gandia device does not indicate the simplicity or compactness of the present invention. Furthermore, this patent fails to indicate means for maintaining all but the illuminated picture unobservable to a viewer examining the entire area which contains the complete series of pictures.

These same failures and disadvantages are also applicable to the system of the Sollogoub et al. patent. An additional disadvantage of the Sollogoub et al. device is that its display timing is not independently controllable but is dependent upon the movement of a vehicle.

Additionally, the other cited patents have similar shortcomings and fail to disclose the relatively simple, easily usable apparatus of the present invention.

Furthermore, none of the cited references discloses the device of the present invention in its overlay embodiment used in conjunction with textual materials.

In light of these and other failures and disadvantages I believe that no previously disclosed device which is known to me indicates, either singly or in combination, the present invention.

SUMMARY OF THE INVENTION

The present invention overcomes the above-noted and other shortcomings of the prior references by providing a novel and improved apparatus for creating the effect of moving pictures in two and three dimensions. This invention is a compact, self-contained unit which can be used, for example, in conjunction with family pictures, advertisements, video games, pilot training and educational instruction. It can also be used with such things as lockets or belt buckles or as a wall display in, for example, a child's bedroom.

Furthermore, because of the fixed nature of the images or frames, the resultant simplicity of operation permits anyone to utilize the invention. Additionally, the operation is independently controllable so the individual user can adjust the apparatus to his or her personal viewing rate.

Also, an advantage of the present invention is that the images within most of the embodiments of the apparatus are unobservable when not activated. Thus, when these embodiments of the present invention are disposed along a bedroom wall, for example, the wall does not appear to be cluttered with a series of pictures when the invention is not activated. Furthermore, during operation only one image is observable by the viewer despite the viewer's sight extending to the whole area which contains the complete series of images.

Still another advantage of the present invention is that it can be used by a child in conjunction with a book containing a series of pictures to create moving pictures in telling a story. Also, the present invention can be used with a page of writing to display only certain portions of lines or of a page. This use could aid in the advancement of an individual's reading skills.

Structurally, the present invention primarily includes a display structure, a scanning controller and a plurality of image producers.

An embodiment of the display structure used to create the effect of pictures moving in three dimensions includes elements stacked adjacent one another to thereby create layers which recede from the viewer as viewed from the front. These elements can include, from front to rear, a transparent polarizer, a number of layers of transparent glass alternately interspersed with layers of liquid crystal, and a polarized reflector. Alternatively, these elements can be spacedly related layers of a substance which is opaque to ultra-violet radiation but transparent to visible light.

An embodiment of the display structure used to create the effect of pictures moving in two dimensions includes elements which provide a two-dimensional surface for displaying images in a plane as observed by a viewer examining the surface. These elements can include, from front to rear as viewed from the front, a transparent polarizer, a layer of transparent glass, a layer of liquid crystals, another layer of transparent glass and another transparent polarizer. The layer of liquid crystals comprises a plurality of individual frames. Alternatively, these elements can be a single layer of a substance which is opaque to ultra-violet light but transparent to visible light. A third alternative includes a single layer of a translucent material which is disposed in spaced relation to the series of images which are to be revealed by the image producers under the control of the scanning controller.

The scanning controller is a device which operates to sequentially activate specific outputs which are associated with the image producers to thereby control the sequence and timing for revealing the component images of the picture to be observed by the viewer as moving. Such a device is old in the art and includes such devices as a ring counter. The controller of the present invention includes means for activating and deactivating the controller, means for varying the order of outputs (and associated image producers) sequentially selected, and means for controlling the rate of selection of the image producers.

As with the display structure, the image producers also have a variety of embodiments. In the display structures which incorporate liquid crystals, the image producers include transparent electrodes which are disposed on the facing surfaces of the transparent glass layers which thus places the electrodes on opposite sides of each liquid crystal layer. Attached to each transparent electrode is a transparent lead which extends to an edge of the glass layer to which the respective electrode is connected. Connecting each lead to the scanning controller is a conductor. In the three-dimensional-type display structure each pair of facing transparent electrodes is configured in a particular position of the object which is to be displayed in motion. In the two-dimensional-type structure the transparent electrodes can be configured as images or can cover the entire inner surface area of the glass layers to which each is adjacent. In this latter embodiment the invention is to be used in conjunction with a series of pictures which are disposed on the side of the display structure opposite the viewer.

An embodiment of the image producers used with the display structure having the ultra-violet light blocking medium includes images of fluorescing material applied to the surfaces of each layer of the medium material, sources of ultra-violet light and conductors connecting the sources of ultra-violet light to the scanning controller.

Still another embodiment of the image producers includes a reflective picture disposed behind a translucent display member, bright light-emitting diodes, shields, and conductors connecting the light-emitting diodes to the scanning controller.

In addition to these two and three dimensional imaging embodiments, other similar specific embodiments of the present invention are disclosed hereinbelow.

Regardless of which specific embodiment is used, the general principle of operation of the present invention is the same. That is, the scanning controller is turned on to thereby sequentially activate particular lamps or electrodes. Upon activation, the respective image is displayed to the viewer while the unactivated images are transparent or otherwise unobservable.

Specifically, in the liquid crystal embodiments having specifically configured electrodes, each pair of facing transparent electrodes is sequentially activated to thereby cause the liquid crystals within the electric field between the activated electrodes to become opaque to visible light and observable under ambient light to the observer. However, in the liquid crystal embodiment having surface covering transparent electrodes and used with external pictures, the crystal frames are opaque when the electrodes are unactivated and transparent when activated. Thus, when a picture is to be revealed to the observer, the scanner activates the respective pair of electrodes thus causing the liquid crystals therebetween to orient themselves to become transparent and thus permit ambient light to illuminate the picture. In the enclosures which include ultra-violet light sources, the scanner sequentially activates each source to thereby cause the respective images to fluoresce and thus become observable to the viewer. The light emitting diode embodiment functions similarly in that the scanner activates each diode sequentially to thus illuminate respective reflective pictures.

In light of the description of the general structure and operation of the present invention, a specific application of it is to use an embodiment, for example the two-dimensional liquid crystal display structure, in conjunction with a book to sequentially reveal particular portions of a page for the observer's observation. By setting the rate selection means of the scanning controller to an appropriate setting, the individual frames can be revealed in such a manner that they appear to be moving. By doing this a child's story book can be made which transforms a presently still picture story into a moving picture story. Also, this application could be used to assist a reader in developing the skill of reading phrases or sentences instead of individual words. Each individual reader would be able to start at his or her own speed and increase at his or her own pace by means of the rate selection means.

Therefore, from the foregoing, it is a general object of the present invention to provide a novel and improved moving picture apparatus.

Other and further objects, features and advantages of the present invention will be readily apparent to those skilled in the art upon a reading of the description of preferred embodiments which follows, when taken in conjunction with the accompanying drawings.

BRIEF DESCRIPTION OF THE DRAWINGS

FIG. 1 is a perspective schematic view of part of the three-dimensional image embodiment of the present invention showing one of the images activated.

FIG. 2 is a side elevation schematic view of the three-dimensional image liquid crystal embodiment of the present invention.

FIG. 3 is a side elevation schematic view of the three-dimensional image embodiment of the present invention utilizing an ultraviolet light source.

FIG. 4 is a perspective schematic view of part of the two-dimensional image embodiment of the present invention.

FIG. 5 is a side elevation schematic view of the two-dimensional image embodiment utilizing liquid crystals.

FIG. 6 is a side elevation schematic view of the two-dimensional image embodiment using an ultra-violet light source.

FIG. 7 is a side elevation schematic view of the two-dimensional image embodiment using a light-emitting diode.

FIG. 8 is a perspective schematic view of an overlay embodying the present invention as used with a picture book.

FIG. 9A is a side elevation schematic view of the planar, single frame moving picture embodiment of the present invention.

FIGS. 9B-9C are front elevation schematic views of the FIG. 9A embodiment.

FIGS. 10A-10B are front elevation schematic views of a variation of the FIG. 9A embodiment.

FIG. 11 is a side elevation schematic view of a first reflective-and-gated picture embodiment of the present invention.

FIG. 12 is a side elevation schematic view of a second reflective-and-gated picture embodiment of the present invention.

FIG. 13 is a side elevation schematic view of a third reflective-and-gated picture embodiment of the present invention.

FIG. 14 is a side elevation schematic view of a fourth reflective-and-gated picture embodiment of the present invention.

FIG. 15 is a side elevation schematic view of a fifth reflective-and-gated picture embodiment of the present invention.

FIG. 16 is a front elevation schematic view of the rotating disk motion picture embodiment of the present invention.

FIG. 17 is a top plan schematic view of the holographic embodiment of the present invention.

DETAILED DESCRIPTION OF PREFERRED EMBODIMENTS OF THE INVENTION

Referring now to the drawings, a perspective view of part of the three-dimensional-type embodiment of the present invention is shown in FIG. 1. This view discloses a display structure 10 which includes a first image 12 and a second image 14. FIG. 1 is drawn to depict that the image 12 is unactivated and, therefore, not visible to the viewer. On the other hand, the image 14 is shown in its activated or observable state. By adding numerous layers of images in varying positions and sequentially activating each image as subsequently described, it is readily apparent that the effect of three-dimensional motion will be created.

One specific apparatus which is used to create this effect is disclosed in FIG. 2. This embodiment generally includes a display structure 15, a scanning controller 16, and a plurality of image producers to be subsequently specified. With the aid of an external light source 17, a viewer 18 can observe the operation of this embodiment of the present invention.

The display 15 includes polarizers 20 and 22, transparent glass members 24, 26 and 28 and liquid crystal members 30 and 32.

The polarizer 20 is of the transparent type whereas the polarizer 22 is of the reflective type. FIG. 2 shows that the transparent polarizer 20 is located within the display 15 adjacent the glass member 24. FIG. 2 further shows that the polarized reflector 22 is disposed adjacent the glass member 28.

The glass members 24, 26 and 28 can be of a type of substance which is transparent to visible light. These members are disposed in spaced relation within the display 15 by being separated by the liquid crystal members 30 and 32. As a result of this placement within the display 15, the glass member 24 has a surface 25 which faces a surface 27 of the glass member 26. Similarly, the glass member 26 has a surface 29 which faces a surface 31 of the glass member 28.

To these surfaces are attached the image producers which include a plurality of transparent electrodes 34, 36, 38 and 40. Attached to the surface 25 is the transparent electrode 34. This electrode 34 is configured in the shape of the image which is desired to be displayed. In this specific embodiment, the electrode 34 is configured in the shape of the image 14 of FIG. 1 as an airplane. Attached to the surface 27 is the transparent electrode 36 which is the mirror image of the configuration of the electrode 34. Similarly attached to the surfaces 29 and 31 are the transparent electrodes 38 and 40, respectively. The electrode 38 is configured in an image which is in a different position than the configuration of the electrode 34. In this particular embodiment, the electrode 38 is in the configuration of the airplane of the image 12. The electrode 40 is a mirror image of the electrode 38.

It is to be noted that, in an alternative embodiment, the image producers could be the polarizers 20 and 22 which would be configured in the image to be displayed. Using these image producers, the electrodes 34, 36, 38 and 40 would be planar sheets covering the respective surfaces to which they are attached. Also in this alternative embodiment, the glass member 26 would be replaced with a polarizer having a full surface area as opposed to a configured area. This embodiment is advantageous because each configured polarizer can be easily changed with a differently configured polarizer.

Connected to the electrode 34 and the surface 25 is a transparent lead 42 which extends to the edge of the surface 25 for connection to a conductor 50. Attached to the electrode 36 and the surface 27 is a transparent lead 44 which extends to the edge of the surface 27 for connection to a conductor 52. Similarly, attached to the electrode 38 and the surface 29 is a transparent lead 46 which extends to the edge of the surface 29 for connection to a conductor 54. Likewise, the electrode 40 and the surface 31 have a transparent lead 48 attached thereto which extends to the edge of the surface 31 for connection to a conductor 56. The conductors 50, 52, 54 and 56 extend to and connect with the scanning controller 16 at respective points of connection.

As previously mentioned, separating the glass members 24, 26 and 28 are the liquid crystal members 30 and 32. In the embodiment of FIG. 2 the liquid crystals are of the type which are transparent to visible light when in the absence of an electrical voltage, but which are opaque to visible light when in the presence of an electrical voltage. That is, they are electrically sensitive birefringent liquid crystals which are transparent until their plane of polarization is rotated by an electrical potential. In addition to liquid crystals, ferroelectric ceramics, neon gas displays, photochromic substances, and phototropic substances could be utilized. Additionally, activation could be by vibration, sound or electromagnetic waves. In the embodiment shown in FIG. 2, liquid crystals are used which are affected by an electrical voltage established between the facing pairs of electrodes 34 and 36 and electrodes 38 and 40 as applied by means of the scanning controller 16.

The scanning controller 16 is a common type of electrical circuit which sequentially selects and applies a voltage to specific sets of outputs. In this embodiment one set of outputs provides a voltage between the conductors 50 and 52 at a specific point in time and a voltage between the conductors 54 and 56 at a different point in time. This type of circuit is commonly known as a ring counter and can be constructed of either discrete or integrated circuits. Additionally, the voltage applied to the outputs can be of varying amounts. For example, an output of approximately five volts could be used to activate particular types of liquid crystals.

To control the scanning controller 16, an activation switch means 60, a direction switch means 62, and a rate switch means 64 are used. The activation means 60 can be a simple on/off switch. The direction means 62 is a switch used to select either a forward or a reverse direction of scan. The rate means 64 is a variable switch which can be maneuvered to adjust the rate of scan from stationary (page select) to the maximum rate of the particular circuits used.

In operation the scanning controller is activated by turning the activation switch means 60 on. Next, a forward or reverse direction of scan is selected through the direction switch means 62. Next, the rate of scan is chosen by manipulating the rate switch means 64. The display structure 15 is now displaying the effect of three-dimensional motion. This is accomplished by the scanning controller sequentially selecting and activating the two pairs of facing electrodes, i.e. the electrodes 38 and 40 and the electrodes 34 and 36. For example, in FIG. 2 the scanning controller 16 is activating the electrodes 34 and 36 as indicated by a region 66 defined by the electric field between the electrodes 34 and 36. The voltage across the region 66 causes the liquid crystals therein to disorient or rotate their plane of polarization and become opaque to the visible light source 17. Thus, this region becomes visible to the viewer 18 thereby imparting an image such as the image 14 in FIG. 1. It is readily apparent to one skilled in the art that by adding additional glass members and liquid crystal members and electrodes configured in differing positions, a smooth three-dimensional moving picture can be created. Furthermore, because of the nature of the scanning controller 16, this motion is continuous in that it repeats itself from either front to rear or rear to front according to the setting of the direction switch means 62.

The previously mentioned alternative embodiment, wherein the polarizers are configured, operates similarly. The structure is transparent until the ring counter is activated. Once it is activated, it causes one image to become visible, then the next.

Another embodiment of the present invention provides an alternative to both the FIG. 2 embodiment and the previously mentioned alternative embodiment, as well as subsequently described embodiments of the present invention. In this embodiment either one of the electrodes or one of the polarizers has a plurality of small holes dispersed throughout the major surface thereof. The addition of such an array of holes extending through one of the electrodes or polarizers allows a person on the side of the display structure opposite the viewer 18 to have clear vision through the structure. This is possible because without an electric field (because of holes in one of the electrodes) or without a polarizer (because of holes in one of the polarizers), no opacity is apparent in the regions of the holes. However, when the holes are sufficiently small and dispersed and the viewer 18 is a sufficient distance from the display structure, the viewer still sees the image undistorted by the holes.

Such an embodiment is useful in such items as vans. The display structure may be mounted in the rear window of the van so that an image can be displayed to following drivers. Although the image is visible to the following drivers, the image does not obscure the driver's rearward vision because the light from outside the van, in addition to making the image visible to the following drivers, passes through the hole regions to the driver of the van. Such operation is believed by Applicant to be the basis for the presently used still scenes shown in the rear windows of some vans. The advantage of the present invention, however, is that moving images, in both two and three dimensions, can thereby be displayed. Furthermore, this type of embodiment could also be used in the lenses of eyeglasses.

Referring now to FIG. 3, an additional embodiment of the present invention is depicted which operates similarly to that shown in FIG. 2, but which is structurally different. This embodiment includes a display structure 100, a scanning controller 101 and subsequently specified image producers.

The display structure includes glass members 102, 104, 106, 108 and 110 in spaced relation to each other.

This disposition in spaced relation defines regions 112, 114, 116 and 118 between respective sets of the glass members. The glass members 102, 104, 106, 108 and 110 are of a substance which is substantially opaque to ultraviolet light but transparent to visible light, such as Cruxite A which blocks approximately ninety-five percent of ultra-violet light.

Applied to the forward and rearward sides of the glass member 104 are images 120 and 122, respectively. Similarly, applied to the forward surface of the glass member 108 is an image 124 and to the rearward surface thereof is applied an image 126. These images, along with the subsequently described ultra-violet radiation sources, form the image producers of the FIG. 3 embodiment. As indicated in FIG. 3, each of these images can be disposed at different locations and can also depict different positions of the object to be shown. For example, the image 122 could correspond to the image 12 of FIG. 1 and the image 120 could correspond to the image 14 with the images 124 and 126 configured to represent different positions of the airplane of FIG. 1. The images 120, 122, 124 and 126 are drawn, painted or otherwise applied to their respective surfaces and are made of a flourescent material, such as the material under the name Yoken. These images are unobservable by the viewer 18 until they fluoresce upon being exposed to ultra-violet radiation.

Such ultra-violet radiation is applied to the respective images of the FIG. 3 embodiment by means of ultra-violet radiation sources 128, 130, 132 and 134 placed within the regions 112, 114, 116 and 118, respectively. To provide electrical power to these sources, source 128 has leads 136 and 138 attached thereto, source 130 has leads 140 and 142 attached thereto, source 132 has leads 144 and 146 attached thereto, and source 134 has leads 148 and 150 attached thereto. These leads extend to and connect with the scanning controller 101.

The scanning controller 101 is similar to the scanning controller 16 previously discussed, and includes activation switch means 154, direction switch means 156 and rate switch means 158. Scanning controller 101 is different from the previously described scanning controller 16 primarily in that it may have to provide a greater electrical output to activate the ultra-violet radiation sources than was required to activate the liquid crystals of the FIG. 2 embodiment.

In operation this embodiment is similar to the FIG. 2 embodiment in that the scanning controller 101 sequentially activates specific outputs to thereby cause respective images to become visible to the viewer 18. In FIG. 3 the source 130 is shown to be activated and emitting ultra-violet radiation. This radiation causes the image 122 to flouresce and thus become visible to the viewer 18. Because the glass member 104 is opaque to ultra-violet radiation, the source 130 fails to activate the image 120. It is for this purpose of blocking ultra-violet radiation to prevent stray illumination that glass members 102, 106 and 110 are used.

It is to be noted that such ultra-violet radiation could also be created by filling regions 112, 114, 116 and 118 with a gas such as mercury vapor and connecting the respective leads to electrodes placed within respective regions instead of to the previously described ultra-violet light sources.

Referring now to FIG. 4, one sees the present invention in its two-dimensional image embodiment. This embodiment includes a series of pictures 200 which include individual frames or scenes 202, 204, 206 and 208. Adjacent this series of pictures is an overlay 210 of the type shown in FIG. 5.

The FIG. 5 embodiment includes a display structure 212, a scanning controller 214 and subsequently defined image producers which are used in conjunction with the pictures 200 and a visible light source 216 to display sequentially selected frames to the viewer 18.

The component parts of this embodiment are similar to those discussed above with reference to FIG. 2 except that only a single layer of a liquid crystal member is used. Furthermore, the single layer provides a collection of individual frames. Specifically, the display structure 212 includes transparent polarizers 218 and 220, transparent glass members 222 and 224, and liquid crystal member 226. As shown in FIG. 5, the polarizer 218 is placed adjacent the front surface of the glass member 222, and the polarizer 220 is placed adjacent the rear surface of the glass member 224. The liquid crystal member 226 is disposed between and adjacent the glass members 222 and 224.

As in the embodiment of FIG. 2, the image producers of the FIG. 5 embodiment comprise transparent electrodes and accompanying leads. Attached to the surface of the glass member 222 which faces the glass member 224 is a transparent electrode 228. Similarly, attached to the surface of the glass member 224 which faces the glass member 222 is a transparent electrode 230. When the display structure 212 is used in conjunction with the pictures 200, the electrodes 228 and 230 cover a frame-sized surface area of the glass members 222 and 224 to which they are attached. However, the display structure 212 can be used without the pictures 200 by having the electrodes 228 and 230 configured in a specific image as was done in the FIG. 2 embodiment. Communicating the electrodes 228 and 230 with the scanning controller 214 are leads 232 and 234, respectively.

The scanning controller 214 is similar to the previously described scanning controllers and includes an activation switch means 238, a direction switch means 240 and a rate switch means 242.

Although the FIG. 5 embodiment is basically similar to that of the FIG. 2 embodiment, one difference is that when the FIG. 5 embodiment is used in conjunction with the pictures 200, the liquid crystals of the liquid crystal layer 226 are of the type which are normally opaque to visible light in the absence of an electrical field and which are transparent to visible light in the presence of such field. Should the FIG. 5 embodiment be utilized without the pictures 200, but instead with configured electrodes, then the liquid crystals used are of the same type as in the FIG. 2 embodiment.

It is to be understood that the above description has merely described a portion of the entire structure which is indicated in FIG. 4. That is, the polarizers 218 and 220 and the glass members 222 and 224 have extended lengths and widths which would allow for the coverage of a plurality of frames such as shown in FIG. 4. Please note, however, that the frames need not be of a uniform size. Furthermore, there are additional electrodes attached to the facing surfaces of the glass members 222 and 224 which are activated sequentially by the scanning controller 214 and which are associated with respective frames such as the frames 202, 204, 206 and 208 of FIG. 4. Likewise, the liquid crystal member 226 is such that portions thereof are activated in response to the activation of respective facing pairs of electrodes.

In operation in conjunction with the pictures 200, the scanning controller 214 sequentially selects these separate pairs of facing electrodes to thereby cause the corresponding volume of liquid crystal to orient and become transparent to visible light. When this occurs, the visible light from the source 216 passes through the activated region of liquid crystal to illuminate the respective frame of the picture 200 thus making it visible to the viewer 18. For example, when the electrodes 228 and 230 are activated, the crystals in the region of the liquid crystal member 226 affected by the resultant electrical field between these electrodes orient themselves and thus allow light to pass through the display structure 212 and illuminate the frame 202. To enhance the illumination of the pictures 200, they can be spaced approximately one inch, for example, away from the display structure 212 so ambient light other than that passing through the display structure can also illuminate the pictures.

It is also to be noted that the operation of the FIG. 5 embodiment can also display three-dimensionally related objects. That is, instead of using the pictures 200, the apparatus includes three-dimensional objects which may be spatially related not only by length and width, as are the pictures 200, but also by depth from one frame to the next.

Another embodiment of the two-dimensional type of the present invention is depicted in FIG. 6. This embodiment includes a planar glass member 300 which is of a type of material similar to that used in the FIG. 3 embodiment. Applied to the surface of this member 300 are a plurality of scenes of which a scene 302 is one. Such scenes are made of a flourescing material as described above with reference to FIG. 3.

Illumination of these scenes is accomplished by sequentially exposing each scene to ultra-violet radiation from sources such as a source 304. Each such radiation source 304 has associated therewith a shield 306 and electrical conductors 308 and 310 thereby communicating the source with a scanning controller 312. The scanning controller 312 is similar to the previously described controllers and includes an activation switch means 314, a directional switch means 316, and a rate switch means 318.

By sequentially activating the radiation sources, each of which is associated with individual scenes as in FIG. 4, the individual scenes are caused to fluoresce and thereby become visible to the viewer 18. Because of the sequential scanning, two-dimensional motion is obtained.

Still another type of embodiment which creates the effect of two-dimensional motion is shown in FIG. 7. In this embodiment a series of pictures 400 which include individual frames, such as those frames shown in FIG. 4, is separated from the viewer 18 by a shield 402. The shield 402 can be a translucent plastic sheet to thereby provide a uniform appearance to the viewer 18 when the device is not activated.

To cause the viewer 18 to see the individual frames, an illumination means 406 is placed on the side of the shield 402 opposite the viewer 18 and is activated to illuminate one frame of the picture 400. A preferred type of illumination means is a bright light-emitting diode. Such illumination means includes a shield 408 and electrical conductors 410 and 412 which communicate the illumination means to a scanning controller 414 of a type previously described and including an activation switch means 416, a direction switch means 418 and a rate switch means 420. As mentioned with reference to the FIG. 6 embodiment, there are a plurality of illumination means similar to the illumination means 406, each of which is associated with an individual frame of the picture 400. Thus when the scanning controller 414 is activated, the individual illumination means are sequentially activated to thereby illuminate individual frames for viewing by the viewer 18.

Referring now to FIG. 8, a preferred use embodiment of the present invention is disclosed. A book 500 includes pages upon each side of which are arranged a series of pictures 502. Separate from the book 500, but used in conjunction therewith to effect moving pictures, is an overlay 504 constructed according to the present invention. For example, the overlay 504 is depicted to be the embodiment shown in FIG. 5. The overlay 504 comprises a series of frames 506, each of which is of a size comparable to each individual picture 502. To implement this according to the embodiment of FIG. 5, the electrodes 228 and 230 thereof which would constitute a single frame 506, would be of a size comparable to each picture 502.

Associated with the overlay 504 is a cable 508 which is an orderly collection of the pairs of conductors (such as the leads 232 and 234) which communicate each pair of frame electrodes with a scanning controller 510 of the type previously described. As in the previously described scanning controllers, the scanning controller 510 has an activation switch means 512, a direction switch means 514 and a rate switch means 516.

By activating the scanning controller 510, each individual frame 506 is sequentially activated to reveal an underlying picture 502. By adjusting the rate switch means 516, a viewer perceives moving pictures from the page of the book 500.

It is, of course, apparent that the frames 506 can be constructed of varying sizes and used in ways other than to merely display pictures. For example, overlays could be used to sequentially reveal portions of textual material at a rate which would cause the reader to increase his reading speed by comprehending writing in groups of words instead of merely individual words. Furthermore, the present invention could be used to create the effect of pictures moving across the walls of a child's room.

Still further, it is apparent that a plurality of ring counters could be used concurrently to have various portions of each of the above-described embodiments either concurrently or sequentially functioning. Also, the scanning process could be performed in conjunction with certain frames which are continuously pulsed on and off independently of the ring counter's scanning process.

Referring now to FIGS. 9A-9C, there is disclosed the single-frame moving picture embodiment of the present invention. This embodiment includes a display structure 600, a scanning controller 602, and image producers generally indicated by the reference numeral 603.

FIG. 9A shows that the display structure 600 includes a front glass member 604 placed in front of a liquid crystal member 606 which in turn is placed in front of a polarizer 608. Disposed between the glass member 604 and the liquid crystal member 606 is a transparent electrode member 610 which has a surface area approximately equal to the facing surface areas of the members 604 and 606. A similar electrode member 612 is disposed between the facing surfaces of the liquid crystal 606 and the polarizer member 608. Extending from these electrode members are electrical leads 613 which connect the electrodes to the scanning controller 602.

The scanning controller 602 may be an ordinary ring counter as previously described, or it may be a simple oscillator known in the art.

The image producers 603 are more fully disclosed in FIGS. 9B and 9C. In these FIGS. the image producers 603 are shown to include a first collection of dot-configured polarizer elements 614 and a second collection of dot-configured polarizer elements 616. Although these FIGS. indicate these polarizers to have a dot shape, they may have any other desirable shape. The elements of the collection of polarizers 614 are disposed on a front surface 618 of the glass member 604 in corresponding orientations so that they polarize light in the same direction. The elements of the collection of polarizers 616 are attached to the front surface 618 of the glass member 604 in an opposite orientation to the collection of polarizers 614 so that the elements 616 pass light having a different polarization than that which the polarizer elements 614 will pass. Having these two collections of polarizers related in this manner permits one collection to become visible to a viewer during one activation state of the scanning controller and permits the other collection to become visible at a different period of activation of the scanning controller 602. Also, these collections are arranged on the glass member 604 to define respective configurations of the images to be displayed.

In FIG. 9B the polarizer collection 614 is shown in its visible state, whereas the polarizer collection 616 is shown in its transparent mode as indicated by the phantom-line drawings. FIG. 9C, on the other hand, shows the collection 616 in its visible mode, whereas the collection 614 is shown in its transparent mode. Thus, from this type of operation it is apparent that within the single frame on which the two collections are disposed, at least two different images can be made to become alternatingly visible.

An inventive variation of the FIGS. 9A–9C embodiment is to configure the electrode 610 in a plurality of images and to have each imaged electrode portion electrically isolated from every other imaged portion. Each of these portions is then connected to a respective output of the scanning controller 602. As the controller 602 scans to activate the various outputs, the plurality of images etched in the electrode 610 are thereby sequentially displayed. Thus, the same multiple imaging effect in a single frame is obtained.

With reference now to FIGS. 10A and 10B, another inventive variation of the embodiment shown in FIG. 9A is shown. This embodiment includes a display structure 620, a scanning controller 622, and image producers which include bands 624, 626, 628, and 630. These bands, in conjunction with an object or objects to be displayed (such as pictures 632 and 633), function to reveal the images to be displayed.

In a specific embodiment of the image producers, the bands 624–630 are a vertically arrayed collection of horizontally extending pairs of electrodes which are connected to the scanning controller 622 by means of leads 634 and 636. These electrode pairs are disposed in a position similar to that of the electrodes 610 and 612 of FIG. 9A embodiment; but are different in that instead of being a single surface covering electrode, the band electrodes of the FIG. 10A embodiment cover only respective portions of the entire surface area. Also, adjacent electrode pairs are electrically isolated from each other. Another difference from the FIG. 9A embodiment is that the FIG. 10A embodiment has a polarizer covering the entire front surface area of the display structure 620 in place of the image-configured polarizer in FIG. 9A.

In operation FIG. 10A indicates that the bands 624 and 628 are to be activated at the same time by the scanning controller 622 by means of being connected thereto by the common lead 634. Likewise, the bands 626 and 630 are commonly connected in electrically parallel manner to the scanning controller 622 by means of lead 636. Therefore, in FIG. 10A it is shown that the scanning controller 622 has activated the electrode bands 626 and 630 to reveal the picture 632 behind these bands. Similarly shown are the electrode bands 624 and 628 in their unactivated states which cause the liquid crystal material disposed between each of these bands to appear opaque and thereby prevent the viewer from seeing the picture 633 behind these respective bands. Referring now to FIG. 10B it is shown that the scanning controller 622 has now activated the bands 624 and 628 to reveal the picture 633 which is behind these two bands. At the same time the bands 626 and 630 become unactivated thereby allowing the liquid crystal associated therewith to appear opaque. It is apparent from this operation that the bands could be made of varying widths and of varying number within any one frame and that a plurality of frames could be used.

In a different, but related, embodiment the bands 624–630 may be bands of polarizer material wherein each band of polarizer has an opposite orientation to each adjacent polarizer. Using this type of band embodiment, a single pair of surface covering electrodes could be used in association therewith. Such a surface-covering electrode would be similar to that shown in FIG. 9A. The operation would also be similar to the FIG. 9A–9C embodiment in that one set of polarizers would be opaque and the other would be transparent under one activation state of the scanning controller 622 and then the opposite would occur under a different activation state of the scanning controller 622.

It is to be noted that in the electrode band embodiment, the liquid crystal member may include nematic liquid crystals and therefore not require polarizers in the front and rear of the display structure.

Referring now to FIGS. 11, 12, and 13, reflective-and-gated picture embodiments of the present invention are shown. FIG. 11 shows a display structure 640, a scanning controller 642 and image producers which will be subsequently described. The display structure 640 includes a first gate member 644 and a second gate member 646 connected together by a connector means 647. The gate member 644 includes a liquid crystal member 648 which is disposed between two surface-covering transparent electrodes 650 and 652. Placed adjacent the surfaces of the electrodes opposite the liquid crystal member 648 are polarizers 654 and 656. The polarizer 656 has a thin layer of reflective material coated on its surface 657 facing the gate member 646. The gate member 646 is constructed similarly to the gate member 644 and includes a liquid crystal member 658, two surface-covering transparent electrode members 660 and 662, and two polarizers 664 and 666. The gate member 646 is disposed in an angular relationship with the gate member 644 so that the plane containing one surface of the member 646 and the plane containing the reflective surface 657 of the member 644 intersect to define an acute angle extending toward the viewer.

These two gate members operate in conjunction with respective reflective pictures 668 and 670 to display an image on the gate member 644 which is visible to a viewer 672.

In operation, the scanning controller alternately activates the two gate members 644 and 646. For example, the scanning controller activates the gate member 646 to become transparent and therefore permit the image of the picture 670 to be reflected off the reflective surface of the polarizer 656 for viewing by the viewer 672. During this portion of the scanning controller's cycle, the liquid crystal member 648 is opaque to thus permit such reflection to occur. During an alternate scanning cycle, the liquid crystal member 648 becomes transparent and the liquid crystal member 658 becomes opaque, thus permitting the image of the picture 668 to become visible to the viewer 672.

It is to be noted that the scanning controller 642 could also be an oscillator which would simultaneously pulse both liquid crystal members to effect the above alternating sequence of images. If such an oscillator were used, however, the pair of polarizers 654 and 656 must be oppositely oriented to the pair of polarizers 664 and 666; alternatively, the liquid crystal member 648 must function opposite to the liquid crystal member 658, for such simultaneous pulsing to effect alternating images. Also, instead of lightly coating the polarizer 656 with a reflective substance, the liquid crystal member 648 may include reflective particles which will reflect the image from the picture 670 when the liquid crystal member 648 is in its opaque mode.

With reference now to FIG. 12, a different embodiment, but one which is similar to the FIG. 11 embodiment, is shown. In this embodiment the gate members 644 and 646 are related in the same manner as in the FIG. 11 embodiment, but added thereto is a mirror 674 extending to the rear of the gate member 644 in acute angular relationship thereto. This permits the viewing by the viewer 672 of the two pictures 668 and 670 which are both on the same, or parallel, planes, as opposed to the angularly related positioning of the pictures in FIG. 11. This is very useful with a book where two pictures are spaced apart on the same page. It is to be noted that the mirror 674 can be planar, convex, or concave in order to affect the size of picture displayed to the viewer. The operation of this embodiment is the same as for the FIG. 11 embodiment.

FIG. 13 shows a variation of the display apparatus shown in FIG. 12. In FIG. 13, the gate member 644 is changed somewhat in its relationship to the gate member 646 as shown in the FIG., yet it still retains its acute angular relationship between the reflective surface of the member 644 and the surface of the member 646 through the connection therebetween by the connector means 675. However, this acute angle now extends away from the viewer. This enables the display of the images to appear on the upper surface of the gate member 646 so that the viewer 672 can observe the image in a normal reading position. Again the two gate members 644 and 646 are operated as described in the FIG. 11 embodiment. However, in FIG. 13 the image of the picture 668 is reflected off the mirror 674 when the liquid crystal member 648 of the gate member 644 is transparent, and then also is reflected off a thin reflective coating which coats the top surface of the gate member 646. When the liquid crystal member 648 of the gate member 644 is opaque, the liquid crystal member of the gate member 646 is transparent to permit the image of the picture 670 to become visible to the viewer 672. As with the previous embodiments, either a ring counter which individually activates the gate members 644 and 646 may be used, or the polarizers or liquid crystals may be such that the alternating display of the images can be effected by a single pulse simultaneously applied to both of the gate members 644 and 646.

Two additional embodiments of the present invention which gate pictures for merging into a single viewing area are shown in FIGS. 14 and 15. FIG. 14 discloses a display structure including a plurality of gate members disposed adjacent each other and overlying a planar collection of pictures, or other material to be displayed as image producers. In particular this FIG. discloses the gate member 644, the gate member 646, and a gate member 682 as each having extending from one end thereof at an included acute angle a mirror member 684, 686, and 688, respectively. These gate and mirror members are shown in FIG. 14 to overlie the pictures 668, 670 and 690. The gate members are also shown to be a part of a single overlay member 691. Further included in this embodiment is a display mirror member 692 on which the images are merged for viewing by the viewer 672. The mirror member 692 has a reflective surface facing the reflective surface of the mirror members 684, 686, and 688. Although not shown in FIG. 14, each of the gate members 644, 646 and 682 are connected to a ring counter as disclosed in the description of previous embodiments. This ring counter sequentially activates each of the gate members to cause the liquid crystal members therein to become transparent at activated times so that the image on the picture associated with the respective activated gate member may be reflected from the mirror members associated with the activated gate member to the viewing mirror 692. This sequential displaying of the various images is obtained by having a coating on the undersides of the mirrors 684, 686 and 688 for reflecting the images from the pictures located directly below the mirror surfaces. However, the coating is thin enough to permit the passage through the mirrors of the light which enters the mirror members from the sides opposite the coated sides. For example, the mirror member 686 has an underside coating which reflects the image from the picture 670 when the gate member 646 is activated so that the liquid crystal member therein is transparent; however, when the liquid crystal member of the gate member 646 is opaque and the liquid crystal member of the gate member 644 is transparent, then the mirror member 686 permits the image from the picture 668 reflecting off of the mirror member 684 to pass through it and on through the mirror member 688 to the viewing mirror 692.

An advantage of this system and the other type of merging systems is that it may be used with a group of physically separated still pictures to present a motion picture scene on a single surface. Also, the reflective surfaces of the mirror members 684, 686 and 688 may be convex or concave to change the size of the images displayed. Such techniques would provide for the use of smaller pictures, and therefore greater quantities of pictures to be placed on a single page. Additionally, it is to be noted that light sources can be placed at various locations on these merging systems to enhance the imaging quality of the embodiments.

Referring now to FIG. 15, an embodiment of a display structure of the present invention which uses a prism 680 for merging various images is shown. This embodiment of the display structure includes the gate member 644 and the gate member 646 which are associated with the angular side surfaces of the prism 680. The prism 680 has a reflective surface 681 from which the angular side surfaces extend at acute angles thereto. Further associated with the gate members 644 and 646 as image producers are a picture 676 and a picture 678, respectively. These pictures may be photographic slides which can have the images thereon projected by light sources which are appropriately associated on the sides of the pictures opposite the sides which are adjacent the gate members. When these pictures are illuminated and permitted to be displayed by means of a ring counter activating the liquid crystal members of the gate members 644 and 646, they are displayed on the reflective surface 681 of the prism 680. By having a prism with a large number of angular sides, it is apparent that a number of pictures can be sequentially displayed to effect motion pictures.

Referring now to FIG. 16, the rotating disk motion picture embodiment of the present invention is shown. The display structure of this embodiment includes a disk member 700 having a member having a plurality of frames 702 with images thereon. The disk member 700 has an opening 704 over which is placed a gate member, such as the previously described gate member 644, and through which one of said frames 702 may be viewed. The gate member 644 is associated with a timing means 706. Also included in this embodiment is a rotating means, such as a motor, which is associated with the frame-containing member 702 for rotating it. This rotating means is also associated with the timing means 706 so that the rotational speed of the frame member 702 and gating speed of the gate member 644 are synchronized.

In operation of this embodiment, the rotation means rotates the frame member 702 thereby causing each of the individual frames 702 to momentarily appear in the opening 704. So that the frames may be coherently displayed to a viewer to effect a motion picture affect, the timing means 706 activates the gate member 644 to become transparent at a time synchronized with the appearance of an individual frame in the opening 704. Therefore, it is apparent that an advantage of this system is that a plurality of disks 700 can be used and easily interchanged to provide a variety of motion picture scenes to be quickly viewed by the viewer.

Referring now to FIG. 17, an embodiment of the present invention using holograms is disclosed. This embodiment includes a display structure 720, a scanning controller 722 and a plurality of image producers within the display structure as subsequently described. The display structure 720 includes a plurality of holographic plates, or members, for example, plates 724, 726, 728, and 730, each of which includes the image producers therein as is known in the art of holography. Also within the display structures 720 are a plurality of illumination means 732, 734, 736 and 738 each associated with a respective one of the holographic plates 724-730. In this embodiment each of the illumination means is disposed at its own respective angle to the group of holographic plates, with each such angle being different from every other angle at which the other illumination means are disposed. Furthermore, the images contained within the holographic plates 724-730 are angularly related therewithin so that they will be activated only by the respective illumination means impinging thereupon at the appropriate angle. Therefore, in this manner it is apparent that by having the scanning controller 722 sequentially activate the illuminating means 732-738, the various images within the display structure 720 are sequentially activated to become visible to a viewer 740 in the form of moving pictures.

It is to be noted that the illuminating means 732-738 may be of any suitable type of lighting means known in the art, such as incandescent lights or xenon lights. Additionally, the holographic plates 724-730 are also those known in the art and may include holographic images therein which are angularly disposed as above stated or ones which react to only certain frequencies of light thus requiring band-pass filters to be used. Other types of holographic images and plates may also be used.

It is also to be noted that variations of FIG. 17 embodiment are possible. For example, the holographic plates could be arranged in side-by-side fashion with each plate having a respective illuminating means associated therewith. This would result in a side-by-side structure similar to those shown in FIGS. 4 and 8. Additionally, the holographic plates could be stacked as in FIG. 17, except they would be in spaced relation as opposed to adjacent relation, thereby to permit the placement of illuminating means between each plate for respective association with individual holographic plates. Furthermore, various lenses, light shields and filters can be used in effecting the motion picture presentation of the images within the holograms. Still further, various angular relationships between the illuminating means and the holographic plates can be provided to change the depth and color, as well as other characteristics, of the images displayed.

An advantage of this embodiment is that it provides holographic moving pictures that are moved electronically as opposed to previously known collections of holographic plates which were arranged such that motion could only be observed by having the viewer move. Also this motion can be obtained by using only a single holographic picture and sequentially activating lights from different angles thereby causing the image within the plate to appear to move.

Regardless of the specific use or embodiment of the present invention, the present invention described herein simply creates in a compact unit the effect of moving pictures. Thus, the present invention for creating the effect of moving pictures in two and three dimensions is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. An apparatus for creating the effect upon a viewer of moving related images, as in a motion picture, comprising:

a display structure including a stacked array of a plurality of transparent members and gate members alternately positioned so that said stacked array has a first end thereof defined by a respective one of the transparent members and a second end thereof defined by another respective one of the transparent members and said stacked array also has a plurality of gate members disposed between consecutive transparent members, whereby there are a plurality of sets of facing surfaces of consecutively stacked transparent members, each set being disposed adjacent the two major surfaces of an associated gate member;

a plurality of pairs of image producers associated with said display structure, each pair of said image producers comprising solely:

a first transparent electrode having a predetermined size, shape and position of the total pictorial image to be displayed, corresponding to a respective moment of the motion, said first transparent electrode being disposed on a respective one of the facing surfaces of a respective one set of these sets of facing surfaces;

a second transparent electrode having a predetermined size, shape and position which is the mirror image of the predetermined size, shape and position of said first transparent electrode, said second transparent electrode being disposed in axial alignment with said first transparent electrode on the other facing surface of the respective set of facing surfaces with which said first transparent electrode is associated; and a scanning controller means, electrically connected to a plurality of pairs of image producers, for sequentially activating at a selectable rate each of said image producers so that each set of first and second transparent electrodes representing a respective total pictorial image to be displayed in motion become periodically visible to the viewer so the effect of motion is imparted thereto.

2. An apparatus as in claim 1 wherein said gate members being liquid crystals.

* * * * *